March 8, 1960  G. R. HUNTINGTON  2,927,802
TRAILER HITCH
Filed Aug. 4, 1958
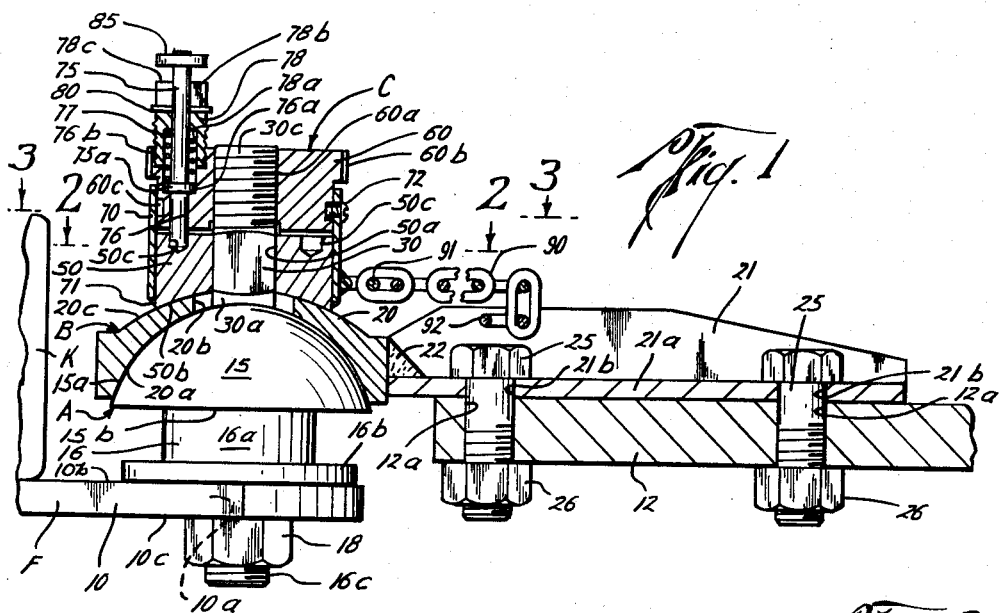
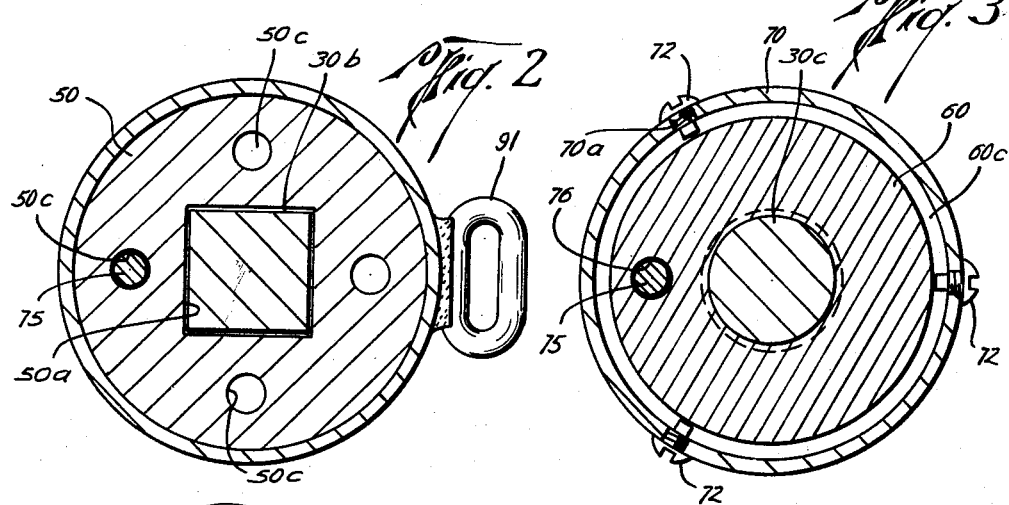
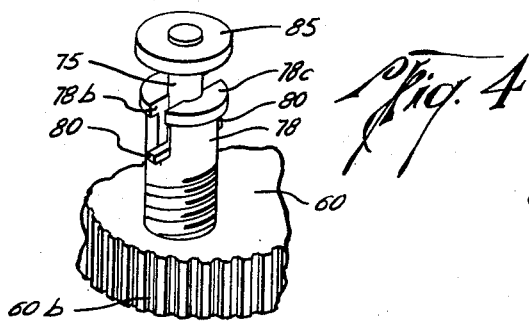
George R. Huntington
INVENTOR.
BY Hayden & Pravel
ATTORNEYS United States Patent Office 2,927,802
Patented Mar. 8, 1960

2,927,802

TRAILER HITCH

George R. Huntington, Rosenberg, Tex.

Application August 4, 1958, Serial No. 752,821

2 Claims. (Cl. 280—511)

This invention relates to new and useful improvements in trailer hitches.

Practically all trailer hitches used today employ a ball and socket connection between the parts thereof which are fixed to the automobile or pulling vehicle and the parts thereof which are fixed to the trailer. Such ball and socket connection is extremely difficult to connect and disconnect and therefore is unsatisfactory in that respect.

It is therefore one object of this invention to provide a new and improved trailer hitch which eliminates the ball and socket connection presently used, and the disadvantages present with such ball and socket construction, while at the same time providing a more satisfactory type of connection for the trailer hitch.

An important object of this invention is to provide a new and improved trailer hitch which operates similarly to a ball and socket type of trailer hitch in that it permits the trailer to swing laterally with respect to the pulling vehicle for moving the trailer around corners and for similar movements, but which is so constructed that the parts fixed to the trailer and the parts fixed to the pulling vehicle may be connected and disconnected from each other without the danger of damaging the fingers of the person making the connection or disconnection.

A particular object of this invention is to provide a new and improved trailer hitch for connecting a trailer to a pulling vehicle, wherein the hitch has a double set of crown and crescent surfaces on the parts of the hitch which are movable relative to each other for providing a stabilized turning movement and a simplified mechanism for effecting a quick connection and disconnection of the trailer and the pulling vehicle.

Another object of this invention is to provide a new and improved trailer hitch wherein a crown shaped swivel surface is adapted to be mounted on a conventional bumper clamp on the bumper of a vehicle, and wherein such crown shaped surface extends only a relatively short distance above such clamp as compared to known types of hitch constructions, whereby the trailer hitch of this invention is subjected to minimum leverage forces when a trailer is pulled.

Still another object of this invention is to provide a new and improved trailer hitch which is formed with parts which are readily locked and unlocked from an easily accessible location.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is a view, partly in elevation and partly in section, illustrating the trailer hitch of this invention;

Fig. 2 is a horizontal cross-sectional view taken on line 2—2 of Fig. 1;

Fig. 3 is a horizontal cross-sectional view taken on line 3—3 of Fig. 1; and

Fig. 4 is an isometric view showing a portion of the trailer hitch as illustrated in Fig. 1, and particularly the locking means thereof.

In the drawings, the letter A designates generally a first hitch member and the letter B designates generally a second hitch member which, as will be more fully explained, are adapted to be connected together for relative turning movement and for rapid connection and disconnection from each other. Briefly, the first hitch member A is adapted to be secured to a conventional bumper clamp F which is schematically illustrated in Fig. 1 as having a flat plate or projection 10 with a substantially vertically extending opening 10a therethrough. The clamp F is connected in any known manner to a bumper K or any other part of an automobile or similar pulling vehicle. The second hitch member B is connected with a tongue 12 which is connected to a trailer or any other vehicle which is adapted to be pulled. As illustrated schematically in Fig. 1 of the drawings, the tongue 12 is in the form of a flat plate having openings 12a therethrough. The first hitch member A and the second hitch member B are releasably locked together by a retainer assembly C, the details of which will be explained more fully hereinafter.

The first hitch member A includes a substantially semi-spherical portion 15 which is formed with an upper convex surface 15a and a lower substantially flat surface 15b. A shank 16 extends downwardly from the semi-spherical portion 15. Preferably, the shank 16 is formed integrally with the semi-spherical portion 15, although it may be formed separately and thereafter welded or otherwise connected to the portion 15. The shank 16 is relatively short in vertical height and the lower flat surface 15b may be positioned very close to the upper surface of the plate 10 of the bumper clamp F. The shank 16 as illustrated in Fig. 1 of the drawings is formed with a cylindrical section 16a having a diameter less than the width of the semi-spherical portion 15 at its lower surface 15b. An enlarged diameter flange 16b may be considered a part of the shank 16 since it is preferably integral therewith. The flange 16b is preferably positioned in contact with the upper surface 10b of the plate 10. The lower portion 16c of the shank 16 extends downwardly from the flange 16b and is of a reduced diameter as compared to the cylindrical portion 16a and the flange 16b. The threaded portion 16c of the shank 16 extends through the opening 10a in the plate 10 so that a nut 18 may be threaded thereon into engagement with the lower surface 10c of the plate 10. In some instances it may be desirable to even further shorten the first hitch member A, in which case the cylindrical portion 16a and the flange 16b of the shank 16 can be omitted. In that event, the threaded portion 16c of the shank 16 would be the only portion thereof remaining and it would extend downwardly from the substantially flat lower surface 15b of the semi-spherical portion 15. Therefore, the substantially flat surface 15b would contact the upper surface 10b of the plate 10. However, normally it is desirable to have a slight amount of space between the lower surface 15b and the upper surface 10b of the clamp F as shown in Fig. 1 of the drawings.

The second hitch member B includes a body or swivel section 20 which is welded or is otherwise connected to a connecting arm 21. Preferably, the connecting arm 21 is substantially U shaped and is welded as indicated at 22 to the body or swivel section 20. The connecting arm or section 21 has a lower plate 21a with openings 21b therethrough which are adapted to be aligned with the openings 12a of the tongue 12. Bolts 25 extend through the aligned openings 21b and 12a and nuts 26 are provided on such bolts 25 for releasably connecting together the connecting arm or section 21 and the tongue 12 as seen in Fig. 1. It will be appreciated of course that other known means could be used for connecting the arm or section 21 to the tongue plate 12, but the bolts 25 and the nuts 26 as illustrated in Fig. 1 are preferred as the connecting means.

The body or swivel section 20 is formed with a lower concave surface 20a which is adapted to engage the upper convex or crown shaped surface 15a of the semi-spherical portion 15. Such concave surface 20a may be termed a crescent shaped surface and it conforms with the upper crown or convex surface 15a, although it does not need to be fully coextensive therewith. A centrally located opening 20b which extends substantially vertically through the central portion of the body or swivel section 20 is substantially cylindrical or circular. A bolt or rod 30 is formed integrally with, or is otherwise connected to the upper crown shaped or convex surface 15a, preferably at the central portion thereof as shown in Fig. 1. The width or diameter of the bolt or rod 30 is less than the diameter or width of the opening 20b so that a slight amount of movement of the body or swivel section 20 is permitted relative to the semi-spherical portion 15 in a vertical plane in addition to the normal swiveling or turning movement of the body or swivel section 20 in a horizontal plane relative to the semi-spherical portion 15.

The body or swivel section 20 is provided with an upper crown shaped or convex surface 20c for a purpose to be hereinafter described.

The bolt or rod 30 has a lower substantially cylindrical portion 30a which extends upwardly from the surface 15a for substantially the thickness of the body or swivel section 20. Above the cylindrical portion 30a, the bolt or rod 30 is formed with a portion 30b having a plurality of external flat surfaces, preferably four in number so as to form a square cross-section as best seen in Fig. 2 of the drawings. Above the flat sided portion 30b, the bolt or rod 30 is provided with a threaded cylindrical section 30c (Figs. 1 and 3).

The retainer assembly C is adapted to be positioned on the bolt or rod 30 for retaining the body or swivel portion 20 in swiveling or turning contact with the crown shaped or convex surface 15a to permit relative turning movement therebetween but without permitting the disconnection of the first hitch member A and the second hitch member B until such is desired. The retaining assembly C includes a retaining sleeve 50 which has a central opening 50a therethrough for receiving the bolt or rod 30. The wall of such opening 50a is formed by a plurality of flat surfaces or sides which correspond with the flat surfaces or sides on the multi-sided portion 30b (Fig. 2). Therefore, when the sleeve 50 is positioned as shown in Figs. 1 and 2 of the drawings, the flat surfaces or sides on the portion 30b and the opening 50a co-act with each other to prevent relative rotational or turning movement therebetween.

The sleeve 50 is formed with a lower concave or crescent shaped surface 50b which is adapted to engage the upper crown shaped or convex surface 20c on the swivel section 20 when the retaining assembly C is mounted as shown in Fig. 1 on the bolt or rod 30.

The upper surface of the sleeve 50 is provided with a plurality of recesses or detents 50c. Although any number of such recesses or detents 50c may be employed, as will be more fully explained, in the preferred form of the invention, there are four of such openings or detents 50c.

The retainer assembly C also includes a nut 60 which is internally threaded at a central opening 60a for threaded engagement with the threads on the threaded section 30c of the bolt 30. The upper annular external surface is formed with an enlarged diameter 60a as indicated in Fig. 1, and such surface 60a is formed with a plurality of narrow grooves to provide a roughened or otherwise knurled surface to facilitate the gripping of the nut 60b for turning same.

In the preferred form of the invention, a band or tube 70 is welded or is otherwise secured to the retainer sleeve 50 at the weld 71 or other suitable connection. For example, a set screw or locking screw extending through the band 70 into the sleeve 50 could be used instead of the weld 71, as will be well understood by those skilled in the art. The upper end of the band 70 is releasably joined to the nut 60 to hold the nut 60 and the sleeve 50 together but to permit relative rotational movement of the nut 60 with respect to the sleeve 50 and the band 70. Such releasable connection is obtained by one or more screws 72 which are threaded into one or more threaded openings 70a in the band 70 and such screw or screws 72 extend into an annular groove 60c formed in the nut 60.

For locking the nut 60 and the sleeve 50 together to prevent a release of the nut 60 from the bolt 30 after the retainer assembly C is in the assembled position, a locking pin or rod 75 is provided for positioning in one of the recesses or detents 50c. The pin 75 is mounted for substantially vertical movement in a substantially vertical opening 76 formed in the nut 60. The opening 76 is preferably provided with an annular shoulder 76a and an upper threaded portion 76b. The pin 75 has a flange 75a connected or formed with the pin 75, and such flange 75a is adapted to abut the shoulder 76a to limit the downward movement of the pin 75 with respect to the nut 60. A coil spring 77 is positioned above the flange 75a and such spring 77 is confined in a recess 78a of an externally threaded plug 78 to apply a downward resilient force to the pin 75 for urging same and maintaining same with its lower end in one of the recesses 50c. The plug 78 is threaded into the threads 76b as shown in Fig. 1. The upper end of the plug 78 is provided with a lateral or diametrical groove 78b for receiving an arm or arms 80. Such arm or arms 80 are secured to or are formed integrally with the pin 75 and they are adapted to engage the bottom portion of the groove or recess 78b when the flange 75a is in contact with the shoulder 76a. However, when the pin 75 is pulled upwardly against the action of the spring 77 to raise the lower end of the pin 75 out of the opening 50c, the pin 75 can then be turned so as to position the arm or arms 80 above and in contact with the upper end 78c of the plug 78. In such position, the arm or arms 80 prevent the pin 75 from moving downwardly to a locking position since the lower end of the pin 75 is held above the lower end of the nut 60 and therefore out of any of the recesses or detents 50c. To facilitate the raising of the pin 75 and the rotation thereof, a flange or handle 85 is secured to or is formed integrally with the upper end of the locking pin 75.

Since the retainer assembly C is released from the bolt or rod 30 when the trailer hitch is in a disconnected position with the hitch members A and B separated from each other, the assembly C is preferably secured to the connector arm 21 by a chain 90 which is made up of as many links as are required to connect and disconnect the assembly C with respect to the bolt 30. A link 91 (Figs. 1 and 2) at one end of the chain 90 is welded to the band 70 and a link 92 at the other end of the chain 90 is welded to the connector arm 21. However, the chain 90 may be connected by a connection means other than welding if so desired.

In the operation or use of the trailer hitch of this invention, the first hitch member A is connected to the plate 10 or other part of the conventional bumper clamp F by positioning the threaded portion 16c of the shank 16 in the opening 10a and then threading the nut 18 on the portion 16c. The second hitch member B is connected to the tongue 12 of the trailer or other vehicle which is adapted to be pulled by positioning the bolts 25 in the aligned openings 21b and 12a and then securing the nuts 26 on such bolts 25.

Thereafter, it is only necessary to drop the second hitch member B onto the first hitch member A with the opening 20b aligned with the bolt or rod 30. With the member B mounted on the member A, the concave or crescent shaped surface 20a is in turning engagement with the crown shaped or convex surface 15a. The members A and B are retained in such connected position by the retainer assembly C which is positioned over the bolt 30 and is dropped thereon until the lower portion of the threads 60a engage with the upper portion of the threads 30c. Since the bolt 30 is formed with the multi-flat sides which co-act and are engageable with the multi-flat sides on the inner bore or opening 50a of the sleeve 50, the sleeve 50 is prevented from rotating thereafter, but the nut 60 may be rotated so long as the pin 75 is in the raised position with the arm or arms 80 above or in contact with the surface 78c. The sleeve 70 is held against turning or rotational movement with respect to the bolt 30 since it is welded to the sleeve 50, but the nut 60 rotates with the screws 72 projecting into the annular groove 60c. The nut 60 is tightened and therefore it moves downwardly with respect to the bolt 30 as the nut 60 is rotated. The sleeve 50 and the band 70 likewise move downwardly as the nut 60 moves downwardly. When the lower crescent shaped or concave surface 50b of the sleeve 50 is in engagement with the crown shaped or convex surface 20c, or is in substantial engagement with such surface 20c, further rotation of the nut 60 is stopped. Actually, in order to prevent any frictional binding of the body or swivel section 20 between the semi-spherical portion 15 and the sleeve 50, it is desirable to reverse the direction of the threading of the nut 60 a partial turn or even a full turn after engagement has been made between the surface 50b and the surface 20c.

In any event, after the nut 60 has been rotated sufficiently to position the surface 50b in engagement, or substantially in engagement with the surface 20c, the locking pin 75 is then released by rotating same to position the arms 80 in alignment with the recess or slot 78b. The spring 77 then acts to move the locking pin 75 in a downward direction so that when the nut 60 is turned just enough to position the pin 75 above one of the recesses 50c, the lower end of the pin 75 enters such recess or detent 50c to lock the nut 60 to the sleeve 50. Thereafter, further rotation of the nut 60 with respect to the sleeve 50 is prevented until such time as the locking pin 75 is raised to the upper position with the arm or arms 80 in contact with or above the surface 78c of the plug 78. It can therefore be seen that the connection of the parts of the trailer hitch of this invention can be made very rapidly and without requiring a person to place his fingers below the semi-spherical portion 15 of the first hitch member A. Therefore, the dangers which are inherent in the known ball and socket types of trailer hitches are avoided. Also, a relatively simple means for effecting the connection is made possible by the construction of this invention and a positive lock is provided in a visible area at the upper portion of the hitch. It should also be pointed out that this hitch is easy to lubricate even when assembled as in Fig. 1.

Various modifications will occur to those skilled in the art without departing from this invention. For example, the band 70 may be omitted, and even the chain 90 may be omitted. If the band 70 is omitted, the sleeve 50 and the nut 60 would be handled separately, and the intermediate sleeve 50 would be first positioned on the bolt 30 with the surface 50b in contact with the surface 20c. Then, the nut 60 would be threaded into position and the locking connection between the nut 60 and the sleeve 50 would be established by positioning the locking pin 75 in one of the recesses or detents 50c.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A trailer hitch for releasably connecting a pulling vehicle to a trailer, comprising a first hitch member adapted to be connected to the pulling vehicle, a second hitch member adapted to be connected to the trailer, said first hitch member having an upper convex surface, said second hitch member having a lower concave surface adapted to engage said upper convex surface during relative turning movement therebetween, said second hitch member having an opening therethrough, a bolt extending upwardly from said upper convex surface through said opening in said second hitch member, a retainer assembly mounted on said bolt above said second hitch member, said retainer assembly including a retainer sleeve, a nut, a band extending from said sleeve to said nut, means connecting said band to said sleeve for rotation therewith and relative to said nut, a flexible connector between said band and said second hitch member for preventing separation of said nut from said hitch when said nut is released from and means connecting said sleeve and said nut together to prevent separation thereof while permitting relative rotation therebetween.

2. A trailer hitch for releasably connecting a pulling vehicle to a trailer, comprising a first hitch member adapted to be connected to the pulling vehicle, a second hitch member adapted to be connected to the trailer, said first hitch member having an upper convex surface, said second hitch member having a lower concave surface adapted to engage said upper convex surface during relative turning movement therebetween, said second hitch member having an opening therethrough, a bolt extending upwardly from said upper convex surface of said first hitch member and through said opening in said second hitch member and having threads on the upper end thereof, said second hitch member also having an upper convex surface, a retainer assembly mounted on said bolt above said second hitch member, said retainer assembly including a retainer sleeve positioned on said bolt and having a lower concave surface adapted to engage said upper convex surface of said second hitch member, co-acting surfaces on said sleeve and said bolt for preventing relative rotation between said sleeve and said bolt, and a nut threaded on said threads of said bolt and engageable with the upper end of said retainer sleeve to prevent upward movement of said retainer sleeve and said second hitch member relative to said first hitch member, and a releasable lock means extending from said nut to said sleeve for preventing relative rotation between said nut and said sleeve to thereby lock said sleeve with said lower concave surface thereof in engagement with said upper convex surface of said second hitch member, whereby jerking or bouncing of the second hitch member upwardly with respect to the first hitch member during the use of the trailer hitch is prevented without interfering with the relative turning movement between the second hitch member and the first hitch member.

References Cited in the file of this patent

UNITED STATES PATENTS

| | | |
|---|---|---|
| 523,605 | Thinnes | July 24, 1894 |
| 1,468,120 | Malasky | Sept. 18, 1923 |
| 2,267,969 | Bennett | Dec. 30, 1941 |

FOREIGN PATENTS

| | | |
|---|---|---|
| 202,451 | Australia | July 5, 1956 |
| 584,595 | France | Feb. 10, 1925 |
| 104,206 | Sweden | Apr. 7, 1942 |

UNITED STATES PATENT OFFICE
CERTIFICATE OF CORRECTION

Patent No. 2,927,802            March 8, 1960

George R. Huntington

It is hereby certified that error appears in the printed specification of the above numbered patent requiring correction and that the said Letters Patent should read as corrected below.

Column 6, line 24, after "from" insert -- said bolt, --.

Signed and sealed this 6th day of September 1960.

(SEAL)
Attest:

ERNEST W. SWIDER
Attesting Officer

ROBERT C. WATSON
Commissioner of Patents